United States Patent Office 2,923,743
Patented Feb. 2, 1960

2,923,743

PROCESS FOR THE PRODUCTION OF ARYL-ALKYL THIOETHERS

Detlef Delfs, Opladen, and Karlfried Wedemeyer, Koln-Stammheim, Germany, assignors to Farbenfabriken Bayer Aktiengesellschaft, Leverkusen, Germany, a corporation of Germany No Drawing. Application April 8, 1958
Serial No. 727,028

1 Claim. (Cl. 260—609)

This invention relates to a novel process for the production of aryl-alkyl thioethers.

It has been found that aryl-alkyl thioethers are obtained if aromatic compounds are reacted with dialkyl disulfides in the presence of condensation agents.

Suitable aromatic compounds are for example o-xylene, phenol, chlorophenol, p-cresol, p-chlorophenol and β-naphthol. Examples of suitable dialkyl disulfides are dimethyl disulfide, diethyl disulfide, diisopropyl disulfide, dibutyl disulfide.

The new process can be carried out in a simple manner by combining the reactants, if necessary in the presence of an inert diluent. Suitable condensation agents are the compounds which are usually employed, such as for example aluminum chloride, aluminum bromide, ferric chloride, zinc chloride, tin tetrachloride, antimony pentachloride, boronfluoride or bleaching earth. These condensation agents can be added in different amounts. In general there should be added at least molecular amounts referred to the dialkyl disulfide but there can be used also higher amounts e.g. a 3-fold surplus of the condensation agent. In many cases, it can be advisable for one of the reactants initially to be added gradually in order to facilitate the regulation of the reaction.

The most suitable reaction temperature depends on the activity of the condensation agent and the reactivity of the two reactants. Generally speaking, however, good results are obtained with reaction temperatures from —20° C. up to 200° C.

With the process according to the invention, one mol of alkyl thiol is always formed as secondary product and this can be used again after being oxidized to dialkyl disulfide. This oxidation can in many cases also take place in the reaction mixture itself. For example, if ferric chloride is used as condensation agent when reacting m-xylene with dimethyl disulfide, the said chloride is reduced to ferrous chloride by the methyl thiol being formed, the methyl thiol being oxidized to dimethyl disulfide.

The compounds obtainable by the process of the invention are suitable as intermediate products, for example for plant-protection agents.

The following examples further illustrate the invention without, in any way, limiting it thereto.

*Example 1*

364 grams of ferric chloride are suspended in 1 liter of m-xylene while stirring. 94 grams of dimethyl disulfide are then introduced at —5 to —10° C. After stirring for 1 hour at —5° C., the temperature is raised within 3 hours to 15° C. Evolution of hydrogen chloride starts from about 5° C. After stirring for 10 hours at 15 to 20° C., the mixture is heated for 1 hour to 50 to 60° C. The reaction is then washed three times with water, using 1 liter on each occasion. 50 ml. of concentrated hydrochloric acid are added to the second washing water. Washing is then carried out with 500 ml. of 4% caustic soda solution and the reaction mixture is distilled by fractionation. 228 grams of methyl mercapto xylol are obtained, boiling point 100 to 115° C. at 6 mm. Hg.

*Example 2*

94 grams of phenol and 47 grams of dimethyl disulfide were dissolved in 150 ml. of chlorobenzene. 80 grams of ferric chloride were then introduced at 20 to 30° C. After stirring for 6 hours, the ferric chloride was washed out with water and the reaction product distilled by fractionation. 43 grams of 2-hydroxymethyl mercaptobenzene were obtained, boiling point 104 to 106° C. at 22 mm. Hg.

*Example 3*

A solution of 1880 grams of phenol in 1000 ml. of chlorobenzene was introduced at 10 to 20° C. into a suspension of 2680 grams of aluminum chloride in 1500 ml. of chlorobenzene. 1600 grams of dimethyl disulfide were then added dropwise within 1½ hours while maintaining the temperature. After stirring for 3 hours at 20° C., heating was carried out on a boiling water bath until evolution of gas ceased. After cooling the reaction mixture was washed out with water and distilled by fractionation. The following were obtained: 555 grams of phenol, 1140 grams of 2-hydroxymethyl mercaptobenzene and 200 grams of 4-hydroxymethyl mercaptobenzene, boiling point 146° C. at 12 mm. Hg.

*Example 4*

94 grams of phenol were heated to 150° C. with 60 grams of dry bleaching earth. At this temperature, 75 grams of dimethyl disulfide were added dropwise within 2 hours while stirring. Stirring was continued for another hour at 150° C., the substance was then filtered off with suction from the bleaching earth and the filter residue was thoroughly washed with benzene. The filtrate was distilled in vacuo. There were obtained 12 grams of 2-hydroxymethyl mercaptobenzene (boiling point 104 to 106° C. at 22 mm. Hg) and 52 grams of 4-hydroxymethyl mercaptobenzene (boiling point 146° C. at 12 mm. Hg).

*Example 5*

A mixture of 188 grams of phenol, 100 grams of activated bleaching earth known under the trade name of "Tonsil," and 94 grams of dimethyl disulfide were heated under reflux to 110 to 120° C. The reflux slowly became weaker and had completely ceased after three hours. No more methyl mercaptan then escapted. The substance was now filtered off from the "Tonsil," the filter residue was washed out with chloroform and the filtrate distilled. There were obtained 36 grams of 2-hydroxymethyl mercaptobenzene and 61 grams of 4-hydroxymethyl mercaptobenzene.

*Example 6*

324 grams of p-cresol are dissolved in 1500 ml. of carbon tetrachloride. To this solution 324 grams of sublimated iron chloride are added at 15° C. Thereafter there are added dropwise 94 grams of dimethyldisulfide at 15° C. while stirring and stirring is continued for 1½ hours at the same temperature. The mixture is then heated to the boil while under reflux for 5½ hours until the hydrochloric acid development has finished. Upon cooling off, 2 liters of water and 50 ml. of concentrated hydrochloric acid are introduced. The organic phase formed is separated and the organic solvent distilled over by means of steam. The precipitate is distilled in vacuo. Thus, 102 grams of 2-hydroxy-5-methyl-1-methyl-mercapto benzene were obtained. Boiling point 96–98° C. at 5 mm. Hg. 112 grams of p-cresol were also recovered.

Example 7

If in the process described in Example 6 instead of the p-cresol 385 grams of p-chlorophenol are used there are obtained 58 grams of 2-hydroxy-5-chloro-1-methyl-mercaptobenzene. Boiling point 116° C. at 5 mm. Hg.

We claim:

Process for the production of an aryl-alkyl thioether which comprises reacting a compound selected from the group consisting of phenol, chlorophenol, xylene and cresol with a dialkyl disulfide, the alkyl groups being lower alkyl radicals, in the presence of at least equivalent amounts of a condensation agent selected from the group consisting of aluminum chloride, aluminum bromide, ferric chloride, zinc chloride, tin tetrachloride, antimony pentachloride, boronfluoride and bleaching earth.

References Cited in the file of this patent

UNITED STATES PATENTS 2,745,878　Mavity _____ May 15, 1956